Patented Dec. 1, 1953

2,661,366

UNITED STATES PATENT OFFICE 2,661,366

ALKANEDIOL MONO-ARYL ORTHO-PHOSPHATES

Harry R. Gamrath and Roger E. Hatton, St. Louis, Mo., assignors to Monsanto Chemical Company, St. Louis, Mo., a corporation of Delaware No Drawing. Application March 11, 1950, Serial No. 149,222

20 Claims. (Cl. 260—461)

This invention relates to alkanediol mono-aryl ortho-phosphates; more specifically, this invention relates to alkanediol mono-aryl ortho-phosphates having the following general formula

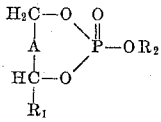

wherein A represents a divalent aliphatic organic radical having the general formula $$C_nH_{2n}$$

wherein $n$ represents a whole number from 1 to 7 inclusive, $R_1$ represents an alkyl radical containing from 1 to 6 carbon atoms, and $R_2$ represents an aryl radical. The aryl radical, such as the phenyl and naphthyl radicals, in the novel compounds included within the scope of this invention, may be unsubstituted or mono or poly substituted. Thus, the aryl radical may contain one or more of the following illustrative, but not limitative, substituent radicals in one or more positions on the ring: Alkyl radicals, such as methyl, ethyl, propyl, isopropyl, butyl, isobutyl, pentyl, etc.; halogens, such as chlorine, bromine, iodine, and fluorine; nitro groups; alkoxy groups such as methoxy, ethoxy, propoxy, isopropoxy, butoxy, etc. Representative of a preferred embodiment of this invention, are those phosphate esters having the above described general formula wherein A represents a radical having the formula

wherein R is selected from the group consisting of hydrogen and alkyl radicals containing from 1 to 6 carbon atoms. The novel alkanediol mono-aryl ortho-phosphate esters which constitute a preferred embodiment of this invention may, therefore, be represented by the formula

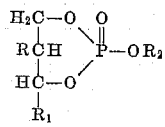

wherein R is selected from the group consisting of hydrogen and alkyl radicals containing from 1 to 6 carbon atoms, $R_1$ represents an alkyl radical containing from 1 to 6 carbon atoms and $R_2$ represents an aryl radical.

The novel compounds of this invention possess outstanding utility in many fields of application. They have been found to possess exceptional utility as plasticizers for synthetic resins, particularly polyvinyl chloride and copolymers containing predominantly polymerized vinyl chloride, imparting to such compositions the properties of flexibility at freezing temperatures and permanence and stability at elevated temperatures. In the field of functional fluids, they have been found to be particularly useful as synthetic lubricants and force transmission fluids, having exceptionally high inherent lubricity. The alkanediol mono-aryl ortho-phosphates of this invention have also been found to have utility as insecticides. In such an application, the novel compounds of this invention may be employed as a solution in a suitable organic solvent or incorporated as the active constituent in a wettable powder or dust formulation. They may also be employed as a dispersion in water. Thus, these novel insecticidal agents may be incorporated into such inert materials as clay, talc, bentonite, gypsum, wood flour, etc. Depending upon the concentration of the insecticidal agent in these formulations, such solid formulations may be used directly as dust or dispersed in water and applied by means of suitable spray equipment. In addition, such formulations may also have incorporated therein, to facilitate application, various sticking agents and wetting, dispersing and emulsifying agents, such as the alkyl aryl sulfonates, sulfated fatty alcohols, alkyl sulfonates, sulfated esters and acids, amide sulfates and sulfonates, sulfated and sulfonated oils, fats and waxes, fatty acids of glycerol and glycol and other polyhydric alcohols, such as sorbitol, and condensation products of ethylene oxide with fatty acids, abietic acid, alkyl phenols such as nonyl phenol, and mercaptans, such as tertiary dodecyl mercaptan.

The novel compounds of this invention are most conveniently prepared by reacting a 1 molecular proportion of an alkanediol, having the formula

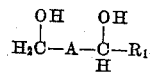

wherein A represents a divalent aliphatic organic radical, having the formula $$C_nH_{2n}$$

wherein $n$ is a whole number from 1 to 7 inclusive and $R_1$ is an alkyl radical containing from 1 to 6 carbon atoms, with approximately a 1 molecular proportion of phosphorus oxychloride to form an alkanediol phosphoryl chloride; reacting the alkanediol phosphoryl chloride thus formed with approximately 1 molecular proportion of an alkali metal arylate, and recovering the alkanediol aryl phosphate thus formed. In preparing the novel phosphate esters which constitute a preferred embodiment of this invention, the alkanediol utilized in the above process may be represented by the formula

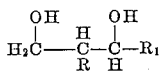

wherein R is selected from the group consisting of hydrogen and alkyl radicals containing from 1 to 6 carbon atoms, and $R_1$ is an alkyl radical containing from 1 to 6 carbon atoms.

The following examples are illustrative of the novel phosphate esters of this invention:

EXAMPLE I

*2-ethyl-1,3-hexanediol phenyl phosphate*

To a one-liter, round-bottom flask fitted with a stirrer, thermometer, dropping funnel and outlet attached to a drying tube, was charged 460.2 g. of phosphorus oxychloride. The dropping funnel was charged with 438.6 g. of 2-ethyl-1,3-hexanediol. The contents of the flask were cooled with an ice bath and the glycol slowly added to the phosphorus oxychloride over a two-hour period, while maintaining a temperature in the range of about 10°–15° C. After all of the glycol had been added, the bath was removed and the temperature of the reaction mixture allowed to rise to about 25° C. with continuous stirring. The outlet of the flask was then connected to a water aspirator and the hydrogen chloride gas formed during the reaction was removed by reducing the pressure slowly to 25 mm. Hg absolute and maintaining the temperature at 20°–25° C. Substantially complete removal of the hydrogen chloride was obtained in about 3 to 4 hours.

The 2-ethyl-1,3-hexanediol phosphoryl chloride product thus prepared, weighed 695 g. and was found to contain 1.12 gram-atoms of chlorine per mol of phosphorus oxychloride charged. Further treatment under reduced pressure would have reduced the chlorine content to approximately 1.0 gram-atom of chlorine per mol of phosphorus oxychloride charged. However, for all practical purposes, the residual amount of chlorine present (0.12 gram-atom) is not disadvantageous to the subsequent reaction.

To a two-liter flask fitted with a stirrer, thermometer, and a dropping funnel was charged 333 g. of phenol and 500 ml. of water. With continuous agitation, 286 g. of a 49.6% water solution of sodium hydroxide was added through the dropping funnel while maintaining the temperature at 20°–25° C.

The alkanediol phosphoryl chloride previously prepared was then placed in a dropping funnel and added with stirring over a period of 80 minutes to the sodium phenate solution while maintaining a reaction temperature in the range of 20°–25° C. The mixture was then stirred for 3 hours at room temperature.

The reaction mixture thus obtained was allowed to settle and the oil layer separated from the aqueous layer. The oil layer was washed twice with a 2% sodium hydroxide solution, several times with a 1% sodium hydroxide solution and finally with water. The washed oil layer was then steamed to remove volatiles, collecting about 850 ml. of distillate. The steamed oil layer was washed with a 1% sodium hydroxide solution and finally with water. The oil layer was then dehydrated by heating to 100° C. under reduced pressure. 681 g. of 2-ethyl-1,3-hexanediol phenyl phosphate was thus obtained, representing a yield of approximately 80% based on the alkanediol initially charged.

The product was found to have the following properties:

| | | |
|---|---|---|
| Acidity | NN | 0.09 |
| Specific gravity, 25°/25° C | | 1.1539 |
| $N_D^{25}$ | | 1.5017 |
| Viscosity: | | |
| 210° F | centistokes | 4.47 |
| 100° F | do | 46.02 |
| Pour point | °F | −10 |
| Flash point (Cleveland open cup) | °F | 390 |
| Fire point (Cleveland open cup) | °F | 450 |

*Analysis*

|  | Per cent phosphorus |
|---|---|
| Calculated for $C_{14}H_{21}O_4P$ | 10.92 |
| Found | 10.53 |

EXAMPLE II

*2-ethyl-1,3-hexanediol cresyl phosphate*

A sample of 2-ethyl-1,3-hexanediol phosphoryl chloride was prepared as described in Example I utilizing 3 mols of phosphorus oxychloride and 3 mols of 2-ethyl-1,3-hexanediol.

A solution of sodium cresylate was prepared from 383 g. of distilled cresol (a mixture of ortho, meta, and para isomers) and 500 ml. of water by adding 286 g. of 49.6% sodium hydroxide solution from a dropping funnel, while holding the temperature at 20–25° C. The phosphoryl chloride was added with stirring to the sodium cresylate solution at 20–25° C. over a period of 80 minutes. The mixture was then stirred for 3 hours at room temperature.

After allowing the oil layer to settle, it was separated and was treated as described in Example I. After dehydration, 693.5 g. of 2-ethyl-1,3-hexanediol cresyl phosphate were obtained, representing a yield of 77% based on phosphorus oxychloride and 2-ethyl-1,3-hexanediol.

The following properties were determined on this product:

| | | |
|---|---|---|
| Acidity | NN | 0.08 |
| Specific gravity, 25°/25° C | | 1.1298 |
| $N_D^{25}$ | | 1.5019 |
| Viscosity: | | |
| 210° F | centistokes | 5.43 |
| 100° F | do | 73.35 |
| Pour point | °F | +5 |
| Flash point (Cleveland open cup) | °F | 395 |
| Fire point (Cleveland open cup) | °F | 465 |

*Analysis*

|  | Per cent phosphorus |
|---|---|
| Calculated for $C_{15}H_{23}O_4P$ | 10.40 |
| Found | 9.87 |

EXAMPLE III

*2-ethyl-1,3-hexanediol beta-naphthyl phosphate*

To a round-bottom flask fitted with a stirrer, thermometer, dropping funnel and outlet attached to a drying tube, was charged 153.4 g. of phosphorus oxychloride. The dropping funnel was charged with 146.2 g. of 2-ethyl-1,3-hexanediol. The contents of the flask were cooled with an ice bath and the glycol slowly added to the phosphorus oxychloride over a two-hour period, while maintaining a temperature in the range of about 10°–15° C. After all the glycol had been added, the bath was removed and the temperature of the reaction mixture allowed to rise to about 25° C. with continuous stirring. The outlet of the flask was then connected to a water aspirator and the hydrogen chloride gas formed during the reaction was removed by reducing the pressure slowly to 10–15 mm. Hg absolute and maintaining the temperature at 20°–25° C. Substantially complete removal of the hydrogen chloride was obtained in about 10 hours.

The 2-ethyl-1,3-hexanediol phosphoryl chloride thus prepared weighed 227.1 g. and was found to contain 1.02 gram-atoms of chlorine per mol of phosphorus oxychloride charged.

To a flask fitted with a stirrer, thermometer and a dropping funnel was charged 154.5 g. of beta-naphthol and 300 ml. of water. With continuous agitation, 86.3 g. of a 49.6% water solution of sodium hydroxide was added through the dropping funnel while maintaining the temperature at 20°–25° C.

The alkanediol phosphoryl chloride previously prepared was then placed in a dropping funnel and added with stirring over a period of about 70 minutes to the sodium naphthenate solution while maintaining a reaction temperature in the range of 20°–25° C. The mixture was then stirred for three hours at room temperature.

The reaction mixture thus obtained was allowed to settle and the oil layer separated from the aqueous layer. The oil layer was washed twice with a 2% solution of a sodium hydroxide, several times with a 1% solution of sodium hydroxide, and finally with water. The washed oil layer was then steamed to remove volatiles. The steamed oil layer was washed with a 1% solution of sodium hydroxide and finally with water. The oil layer was then dehydrated by heating to 100° C. under reduced pressure. 271.4 g. of 2-ethyl-1,3-hexanediol beta-naphthyl phosphate was thus obtained, representing a yield of approximately 81% based on the alkanediol initially charged.

The product was found to have the following properties:

Specific gravity 25°/25° C _____ 1.1814
$N_D^{25}$ _____ 1.5543

EXAMPLE IV

*1,3-hexanediol phenyl phosphate*

In accordance with the procedure described in Example I, 1,3-hexanediol phenyl phosphate was prepared utilizing the following reactants:

Phosphorus oxychloride _____ g__ 76.7
1,3-hexanediol _____ g__ 59.1
Sodium phenate solution:
   Phenol _____ g__ 54.5
   Water _____ ml__ 80
   49.6% sodium hydroxide solution___ g__ 46.8

Substantially pure 1,3-hexanediol phenyl phosphate was obtained.

EXAMPLE V

*1,3-butanediol phenyl phosphate*

To a one-liter, round-bottom flask equipped with a stirrer, thermometer, dropping funnel and outlet, was charged 306.8 g. of phosphorus oxychloride. 180.2 g. of 1,3-butanediol was then placed in the dropping funnel. This latter material was then slowly added to the phosphorus oxychloride over a period of 1¾ hours while maintaining a temperature in the range of from about 10°–15° C. With continuous stirring, the temperature of the mixture was then allowed to rise to room temperature. The outlet of the flask was connected to a water aspirator and the pressure slowly reduced to 20 mm. Hg absolute where it was maintained for 1½ hours to assure removal of the hydrogen chloride formed during the reaction. The 1,3-butanediol phosphoryl chloride thus formed weighed 350 g. and contained 1.10 gram-atoms of chlorine per mol of phosphorus oxychloride charged.

To a two-liter flask fitted with a stirrer, thermometer and dropping funnel was charged 218 g. of phenol and 310 ml. of water. 187 g. of a 49.6% water solution of sodium hydroxide was then added through the dropping funnel to the phenol-water mixture while continuously stirring and maintaining a temperature in the range of from about 20°–25° C. The alkanediol phosphoryl chloride previously prepared was then added with stirring to the sodium phenate solution over a period of about 70 minutes, while maintaining a reaction temperature of 20–25° C. The resulting mixture was stirred for 3 hours at room temperature, periodically adding small amounts of sodium hydroxide to maintain the reaction mixture alkaline to phenolphthalein.

The reaction mixture was allowed to settle and the oil layer separated and washed with dilute sodium hydroxide solutions and water. The oil was then dehydrated by heating to 100° C. under reduced pressure.

The product had the following properties:

Acidity _____ NN__ 0.07
Specific gravity 25°/25° C _____ 1.2507
$N_D^{25}$ _____ 1.5163
Viscosity:
   210° F _____ centistokes__ 3.89
   100° F _____ do____ 27.22
Pour point _____ °F__ −10°

EXAMPLE VI

*1,3-butanediol cresyl phosphate*

In accordance with the procedure described in Example V, 1,3-butanediol cresyl phosphate was prepared utilizing the following reactants:

Phosphorus oxychloride _____ g__ 153.4
1,3-butanediol _____ g__ 90.1
Sodium cresylate solution:
   Cresol _____ g__ 249.5
   Water _____ ml__ 310
   49.6% sodium hydroxide_____ g__ 187

Substantially pure 1,3-butanediol cresyl phosphate was obtained.

EXAMPLE VII

*1,3-butanediol para-chlorophenyl phosphate*

To a round-bottom flask fitted with a stirrer, thermometer, dropping funnel and outlet attached to a drying tube, was charged 153.4 g. of POCl₃. The dropping funnel was charged with 90.1 g. of 1,3-butanediol. The contents of the flask were cooled with an ice bath and the glycol slowly added to the phosphorus oxychloride over a two-hour period, while maintaining a temperature in the range of about 10°–15° C. After all of the glycol had been added, the bath was removed and the temperature of the reaction mixture allowed to rise to about 25° C. with continuous stirring. The outlet of the flask was then connected to a water aspirator and the hydrogen chloride gas formed during the reaction, was removed by reducing the pressure slowly to about 25 mm. Hg absolute and maintaining the temperature at 20°–25° C. Substantially complete removal of the hydrogen chloride was obtained in about 3 to 4 hours.

The 1,3-butanediol phosphoryl chloride thus prepared was found to contain 1.01 gram-atoms of chlorine per mol of phosphorus oxychloride charged.

To a flask fitted with a stirrer, thermometer, and a dropping funnel was charged 136.3 g. of para-chlorophenol and 140 ml. of water.

With continuous agitation, 85.5 g. of a 49.6% water solution of sodium hydroxide was added through the dropping funnel while maintaining the temperature at 20°–25° C.

The alkanediol phosphoryl chloride previously prepared was then placed in a dropping funnel and added over a period of approximately three hours to the sodium chlorophenate solution while stirring and maintaining a reaction temperature in the range of 5–10° C. The reaction mixture was then stirred for three hours at room temperature.

The reaction mixture thus obtained was allowed to settle and the oil layer separated from the aqueous layer. The oil layer was washed twice with a 2% solution of sodium hydroxide, several times with a 1% solution of sodium hydroxide and finally with water. The oil layer was then dehydrated by heating to approximately 100° C. under reduced pressure. 221.1 g. of 1,3-butanediol para-chlorophenyl phosphate was thus obtained, representing a yield of approximately 84% based on the alkanediol initially charged.

The product was found to have the following properties:

Specific gravity 25°/25° C_____ 1.3495
$N_D^{25}$_____ 1.5228

Other compounds which are included within the scope of this invention, and which may be prepared in accordance with the procedure set forth in the preceding examples, are contained in the following list, which list is considered to be illustrative rather than limitative of the scope of this invention:

1,3-butanediol o-chlorophenyl phosphate
2-methyl-1,3-butanediol pentachlorophenyl phosphate
2-isopropyl-1,3-butanediol 2,4 - dichlorophenyl phosphate
2-pentyl-1,3-butanediol 2,4,5 - tribromophenyl phosphate
2-n-hexyl-1,3-butanediol o-bromo-p-cresyl phosphate
2-(2-methylpentyl)-1,3-butanediol o-methoxyphenyl phosphate
1,3-pentanediol cresyl phosphate
2-ethyl-1,3-pentanediol o-ethylphenyl phosphate
2-propyl-1,3-pentanediol p-iodophenyl phosphate
2-butyl-1,3-pentanediol p-nitrophenyl phosphate
2-isobutyl-1,3-pentanediol β-naphthyl phosphate
2-pentyl-1,3-pentanediol 2,4 - diethoxyphenyl phosphate
1,3-hexanediol o-cresyl phosphate
2-methyl-1,3-hexanediol p-bromophenyl phosphate
2-ethyl-1,3-hexanediol p-chloro-o-cresyl phosphate
2 - butyl-1,3-hexanediol o-bromo-p-methoxyphenyl phosphate
2 - isoamyl-1,3-hexanediol 2,4 - dimethylphenyl phosphate
2-n-hexyl-1,3-hexanediol p-propylphenyl phosphate
1,3-heptanediol cresyl phosphate
2-ethyl-1,3-heptanediol 2,3,4,5-tetrabromophenyl phosphate
2-isopropyl-1,3-heptanediol o-fluorophenyl phosphate
2-propyl-1,3-heptanediol p-chlorophenyl phosphate
2-butyl-1,3-heptanediol m-cresyl phosphate
2-pentyl - 1,3 - heptanediol 2,4 - dichlorophenyl phosphate
1,3-octanediol phenyl phosphate
2 - methyl-1,3-octanediol 2,4,5 - trichlorophenyl phosphate
2-ethyl-1,3-octanediol o-iodophenyl phosphate
2-isopropyl-1,3-octanediol cresyl phosphate
2-isobutyl-1,3-octanediol p-methoxyphenyl phosphate
2-pentyl-1,3-octanediol p-ethoxyphenyl phosphate
1,3-nonanediol phenyl phosphate
2-methyl-1,3-nonanediol phenyl phosphate
2-ethyl-1,3-nonanediol o-chlorophenyl phosphate
2 - propyl - 1,3 - nonanediol 2,4 - dichlorophenyl phosphate
2-butyl-1,3-nonanediol p-nitrophenyl phosphate
2-pentyl-1,3-nonanediol p-ethylphenyl phosphate
2-hexyl-1,3-nonanediol p-methoxyphenyl phosphate
4-methyl-1,3-pentanediol cresyl phosphate
2-methyl-4-methyl - 1,3 - pentanediol o-chlorophenyl phosphate
2-butyl-4-methyl - 1,3 - pentanediol α - naphthyl phosphate
4-methyl-1,3-hexanediol phenyl phosphate
2 - methyl-4-ethyl-1,3-hexanediol p-nitrophenyl phosphate
2-propyl - 4,5 - dimethyl - 1,3 - hexanediol cresyl phosphate
2-pentyl-4-ethyl - 5 - methyl - 1,3 - hexanediol o-bromophenyl phosphate
5-ethyl-1,3-heptanediol phenyl phosphate
2-ethyl - 4,5 - dimethyl - 1,3 - heptanediol cresyl phosphate
2-butyl - 4-ethyl-1,3-heptanediol phenyl phosphate
2,4,5-trimethyl-1,3-heptanediol p - chlorophenyl phosphate
6-methyl - 1,3 - heptanediol 2,4 - dichlorophenyl phosphate
6-methyl-1,3-octanediol phenyl phosphate
2-propyl-4-methyl-1,3-octanediol cresyl phosphate
1,4-pentanediol phenyl phosphate
3-methyl-1,4-hexanediol cresyl phosphate
2-ethyl-5-methyl-1,4-heptanediol p-ethylphenyl phosphate
1,5-heptanediol phenyl phosphate
2-methyl-1,5-heptanediol 2,4 - dichloro-α-naphthyl phosphate
3-isopropyl-1,5-heptanediol o-chlorophenyl phosphate
3-butyl-6-methyl-1,5-heptanediol pentachlorophenyl phosphate The procedure set forth in the preceding examples for the preparation of the novel compounds of this invention is subject to wide variation. For example, in the first step of the reaction, namely, the preparation of the alkanediol phosphoryl chloride, approximately equimolecular proportions of the reactants are preferred but a slight excess of either material may be utilized. Similarly, the temperature maintained during the first step of the reaction may be varied over a wide range although lower temperatures are to be preferred. Preferably, the temperature of the reaction mixture during the preparation of the alkanediol phosphoryl chloride is maintained within the range of from about 0° C. to about 25° C. Temperatures as high as 50° C. may, however, be utilized and are particularly advantageous towards the end of the reaction to facilitate the removal of the hydrogen chloride formed. The hydrogen chloride formed during the reaction may be removed by any method well known to those skilled in the art, such as, by blowing the mixture with air or by placing the reaction mixture under reduced pressure.

In the formation of the alkanediol phosphoryl chloride, the reaction may be forced to completion by allowing the reaction mass to remain under reduced pressure until the mass analyzes essentially 1 gram-atom of chlorine for each mol of phosphorus oxychloride charged. For all practical purposes, however, when the alkanediol phosphoryl chloride analyzes about 1.1 gram-atoms of chlorine for every mol of phosphorus oxychloride charged, the mass is of sufficient purity for use in the preparation of the neutral phosphate ester.

The reaction between the alkanediol phosphoryl chloride and the alkali metal arylate is best carried out in an aqueous medium. While equimolecular proportions of reactants may also be used in this reaction, using the chlorine analysis as the basis for the charge, it has been found to be desirable to utilize a slight excess of the alkali metal arylate. Thus, it is preferred that approximately 1.05 mols to 1.5 mols of the alkali metal arylate be utilized for each molecular proportion of the alkanediol phosphoryl chloride. Any of the alkali metal salts of the substituted or unsubstituted phenols may be utilized. Typical of such salts are the sodium, potassium and lithium salts. The temperature during the reaction between the alkali metal arylate and the alkanediol phosphoryl chloride may also be varied over a wide range. Preferably, however, it is maintained within the range of from about 0° C. to about 50° C. After the reaction between the alkanediol phosphoryl chloride and the alkali metal arylate is complete, the alkanediol aryl phosphate may be recovered and further purified, if desired, by any of the methods well known to those skilled in the art of the recovery and purification of phosphate esters.

What is claimed is:

1. As new chemical compounds, alkanediol mono-aryl ortho-phosphates having the formula

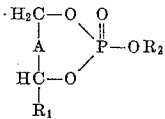

wherein A represents a divalent aliphatic organic radical having the general formula $C_nH_{2n}$ wherein $n$ represents a whole number from 1 to 7 inclusive, $R_1$ represents an alkyl radical containing from 1 to 6 carbon atoms and $R_2$ represents an aryl radical.

2. As new chemical compounds, alkanediol mono-aryl ortho-phosphates having the formula

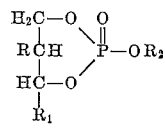

wherein R is selected from the group consisting of hydrogen and alkyl radicals containing from 1 to 6 carbon atoms, $R_1$ represents an alkyl radical containing from 1 to 6 carbon atoms and $R_2$ represents an aryl radical.

3. 2-ethyl-1,3-hexanediol phenyl phosphate.
4. 2-ethyl-1,3-hexanediol cresyl phosphate.
5. 1,3-butanediol phenyl phosphate.
6. 1,3-butanediol cresyl phosphate.
7. 1,3-hexanediol phenyl phosphate.
8. A process for preparing alkanediol mono-aryl ortho-phosphates having the formula

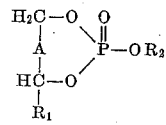

wherein A represents a divalent aliphatic organic radical having the formula $C_nH_{2n}$ wherein $n$ represents a whole number from 1 to 7 inclusive, $R_1$ represents an alkyl radical containing from 1 to 6 carbon atoms and $R_2$ represents an aryl radical which comprises reacting a one molecular proportion of an alkanediol phosphoryl chloride having the formula

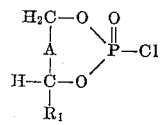

wherein A represents a divalent aliphatic organic radical having the formula $C_nH_{2n}$ wherein $n$ represents a whole number from 1 to 7 inclusive, and $R_1$ represents an alkyl radical containing from 1 to 6 carbon atoms with from about 1.05 to about 1.5 mols of an alkali metal arylate in an aqueous medium while maintaining a temperature in the range of from about 0° C. to about 50° C.

9. A process for the preparation of alkanediol mono-aryl ortho-phosphates having the formula

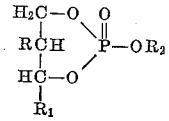

wherein R is selected from the group consisting of hydrogen and alkyl radicals containing from 1 to 6 carbon atoms, $R_1$ represents an alkyl radical containing from 1 to 6 carbon atoms and $R_2$ represents an aryl radical, which comprises reacting a one molecular proportion of an alkanediol phosphoryl chloride having the formula

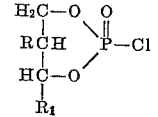

wherein R is selected from the group consisting of hydrogen and alkyl radicals containing from 1 to 6 carbon atoms and $R_1$ is an alkyl radical containing from 1 to 6 carbon atoms with from about 1.05 to about 1.5 mols of an alkali metal arylate in an aqueous medium while maintaining a temperature in the range of from about 0° C. to about 50° C.

10. The process as described in claim 9 wherein the alkanediol phosphoryl chloride is 2-ethyl- 1,3-hexanediol phosphoryl chloride and the alkali metal arylate is sodium phenate.

11. The process as described in claim 9 wherein the alkanediol phosphoryl chloride is 2-ethyl-1,3-hexanediol phosphoryl chloride and the alkali metal arylate is sodium cresylate.

12. The process as described in claim 9 wherein the alkanediol phosphoryl chloride is 1,3-butanediol phosphoryl chloride and the alkali metal arylate is sodium phenate.

13. The process as described in claim 9 wherein the alkanediol phosphoryl chloride is 1,3-butanediol phosphoryl chloride and the alkali metal arylate is sodium cresylate.

14. The process as described in claim 9 wherein the alkanediol phosphoryl chloride is 1,3-hexanediol phosphoryl chloride and the alkali metal arylate is sodium phenate.

15. The process for the preparation of alkanediol mono-aryl ortho-phosphates having the formula

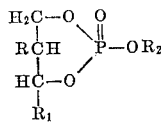

wherein R is selected from the group consisting of hydrogen and alkyl radicals containing from 1 to 6 carbon atoms, $R_1$ represents an alkyl radical containing from 1 to 6 carbon atoms and $R_2$ represents an aryl radical, which comprises reacting approximately a 1 molecular proportion of an alkanediol having the formula

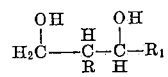

wherein R is selected from the group consisting of hydrogen and alkyl radicals containing from 1 to 6 carbon atoms and $R_1$ is an alkyl radical containing from 1 to 6 carbon atoms, with approximately a 1 molecular proportion of phosphorus oxychloride, while maintaining a temperature in the range of from about 0° C. to about 50° C., and while removing the hydrogen chloride formed, thereby forming an alkanediol phosphoryl chloride, reacting the alkanediol phosphoryl chloride thus formed with from about 1.05 mols to about 1.5 mols of an alkali metal arylate in an aqueous medium while maintaining a temperature in the range of from about 0° C. to about 50° C., and recovering the alkanediol mono-aryl ortho-phosphate.

16. The process as described in claim 15 wherein the alkanediol is 2-ethyl-1,3-hexanediol and the alkali metal arylate is sodium phenate.

17. The process as described in claim 15 wherein the alkanediol is 2-ethyl-1,3-hexanediol and the alkali metal arylate is sodium cresylate.

18. The process as described in claim 15 wherein the alkanediol is 1,3-butanediol and the alkali metal arylate is sodium phenate.

19. The process as described in claim 15 wherein the alkanediol is 1,3-butanediol and the alkali metal arylate is sodium cresylate.

20. The process as described in claim 15 wherein the alkanediol is 1,3-hexanediol and the alkali metal arylate is sodium phenate.

HARRY R. GAMRATH.
ROGER E. HATTON.

References Cited in the file of this patent

UNITED STATES PATENTS

| Number | Name | Date |
|---|---|---|
| 2,382,622 | Toy | Aug. 14, 1945 |

OTHER REFERENCES

Wichelhaus Annalen der Chem. und Pharmacie Supp. vol. 6 (1868), pp. 262–264.

Gerrard, J. Chem. Soc. (London), (1945), vol. 148, page 106.

Arbuzov et al., Bull. acad. sci. R. R. S. S. Class sci. chim. (1948), pp. 208–18 as abstracted in Chem. Abstr. vol. 42, columns 4932–4934 (1948).